Sept. 15, 1925. 1,553,824
F. C. LANGENBERG
METHOD OF AND APPARATUS FOR MAKING METALLIC ARTICLES
Filed March 28, 1925 2 Sheets-Sheet 2

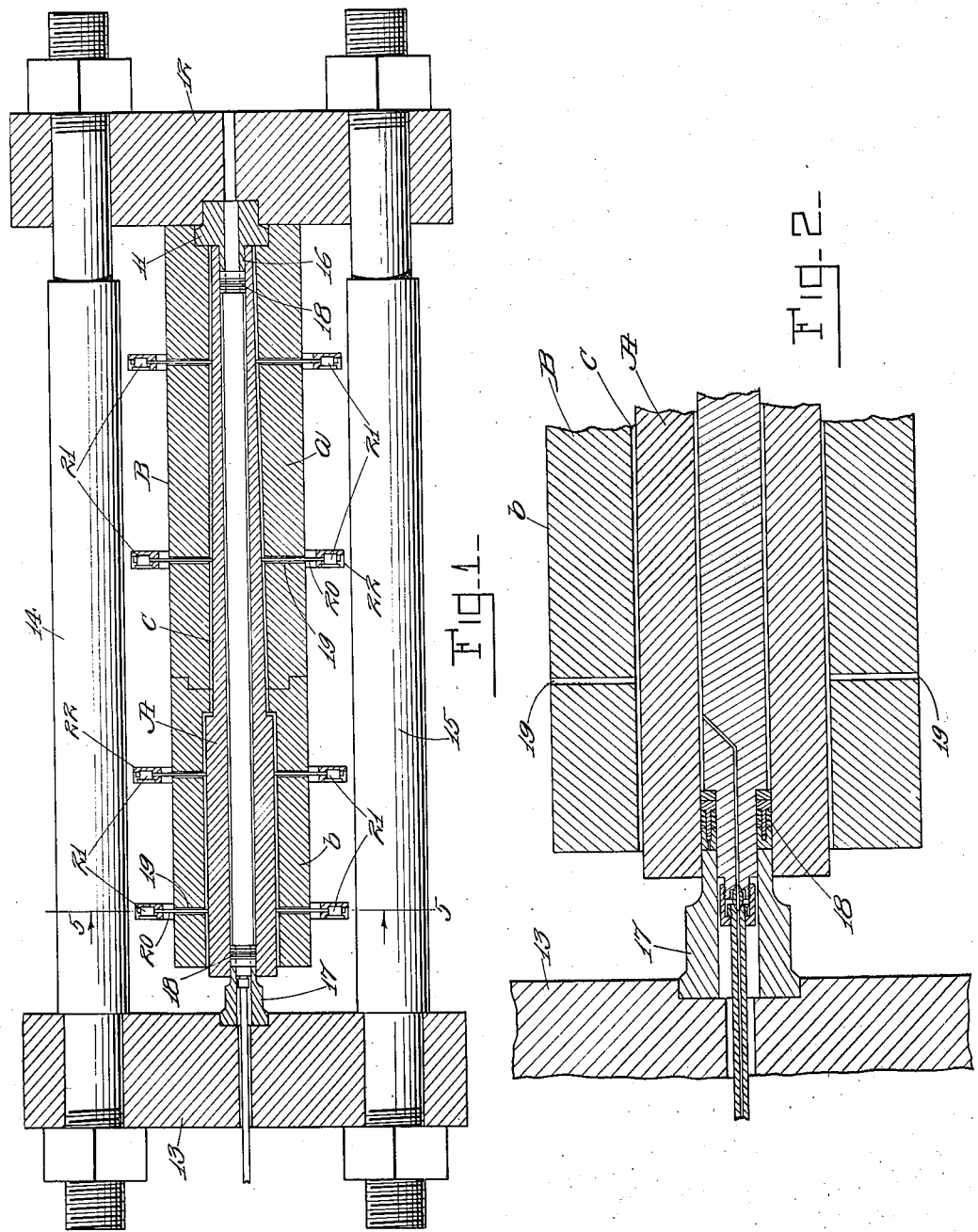

INVENTOR=
Frederick C. Langenberg
By Macleod, Calvert, Copeland and Sire
Attys

Patented Sept. 15, 1925.

1,553,824

UNITED STATES PATENT OFFICE.

FREDERICK C. LANGENBERG, OF CAMBRIDGE, MASSACHUSETTS, ASSIGNOR OF ONE-HALF TO TRACY C. DICKSON, OF WATERTOWN, MASSACHUSETTS.

METHOD OF AND APPARATUS FOR MAKING METALLIC ARTICLES.

Application filed March 28, 1925. Serial No. 19,001.

*To all whom it may concern:*

Be it known that I, FREDERICK C. LANGENBERG, a citizen of the United States, residing at Cambridge, county of Middlesex, State of Massachusetts, have invented a certain new and useful Improvement in Methods of and Apparatus for Making Metallic Articles, of which the following is a specification, reference being had therein to the accompanying drawings.

The present invention relates to the manufacture of metallic and particularly steel articles. Heretofore, it has been known that if an article of steel is expanded or stretched beyond its elastic limit its elastic limit will be permanently raised. Attempts have been made to apply this principle to the manufacture of hollow articles particularly guns, but no considerable commercial success has been attained and the process has not been generally employed. Except where the article has been of uniform diameter and thickness, it has been impossible to regulate the pressure so that uniform or predetermined increases in the elastic limit will result. For instance, in the manufacture of a gun, the thickness of the barrel varies throughout the length and, therefore, if the gun is subjected to an expanding pressure which is uniform throughout the length of the gun, the different parts of the gun will be expanded different amounts, thus producing a structure of irregular shape, and further, the elastic limit of different parts will be increased by different amounts, according to the amount of expansion to which the particular part has been subjected. Attempts have been made to expand separate portions successively, but this produces intermediate zones where undetermined conditions exist, and is also impractical.

My present invention provides a method and apparatus for the manufacture of metallic articles, particularly but not necessarily hollow metallic articles, by which definite predetermined increases in the elastic limit may be effected, and this increase accurately controlled. While my invention is chiefly applicable to the manufacture of hollow or tubular articles by the application of pressure on the inside which produces circumferential enlargement, it is also applicable to the manufacture of articles by longitudinal stretching. My present invention makes it possible to make such articles as guns and shells directly from castings without resorting to any forging operations. My invention renders it practical to make guns, shells, steel flasks, tubes, and the like, of increased strength, or from cheaper material with equal strength and accordingly reduces the expense of manufacture. In the manufacture of guns of medium calibres, it makes possible the manufacture of guns from single pieces of material thus doing away with the expense of manufacturing the several pieces of a built-up gun with the difficulties attendant on shrinking the pieces together and the uncertainties resulting therefrom.

Stated generally, my novel method consists in subjecting the article to fluid pressure which will produce a stretching of the fibres beyond the elastic limit, the work being done under conditions such that the stretching of the metal will be stopped when the desired increase in the elastic limit had been reached. The apparatus for practicing my improved invention consists primarily in a member which is complementary to the shape and dimensions of the finished piece, due allowance being made for final shrinkage, and in means for applying an expanding pressure to the article to cause the same to be stretched until it is restrained from further movement by contacting with the adjacent wall of the member. When intended to produce circumferential stretching, a container having a bore complementary in size and shape to the exterior of the finished article is used, and pressure is introduced into the bore of the article expanding it until further movement is stopped by the container. This treatment produces a multiple effect, the main factor of which is the increase in the elastic limit of the fibres tangentially. There are other effects which will not be discussed.

The container or mold which is employed as the abutment to prevent change in shape beyond a pre-determined point is not a part of the finished article but is complementary thereto and is of a size and strength such that it will positively prevent further change of shape when the pre-determined point has been reached.

Since I have heretofore practiced my invention in connection with the manufacture of hollow steel articles, such as guns and high explosive shells, I have shown in the accompanying drawings an apparatus for this work. It will be understood, however, that I do not limit myself to the particular product produced by the employment of my novel method and apparatus.

I have also shown and described my invention as practiced in the manufacture of an article of circular cross-section, but it will be understood that articles of non-circular cross-section may also be produced.

The invention will be fully understood from the following description when taken in connection with the accompanying drawings and the novel features thereof will be pointed out and clearly defined in the claims at the close of this specification.

In the drawings:

Fig. 1 is a longitudinal section of an apparatus embodying my invention for practicing my novel method.

Fig. 2 is an enlarged view of certain portions of the apparatus shown in Fig. 1.

Figure 3:
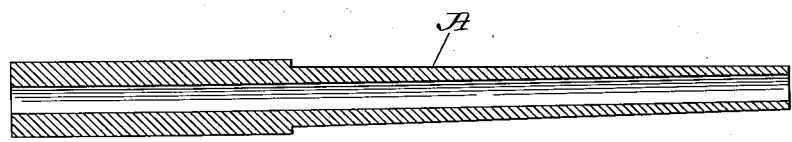
Fig. 3 is a longitudinal section of the article to be produced.
Figure 4:
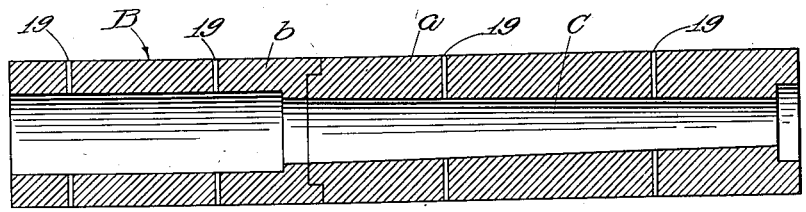
Fig. 4 is a longitudinal section of the container.
Figure 5:
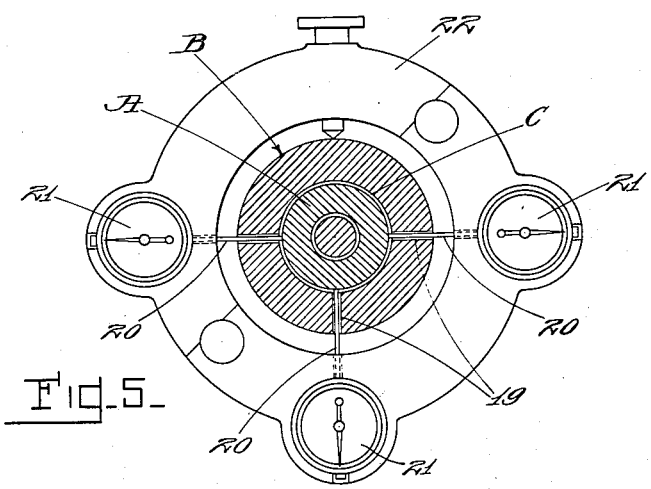
Fig. 5 is a section on the line 5—5, Fig. 1, illustrating the construction of one of the dial gauges employed in practicing the invention.

Referring now to the drawings, it will be assumed that it is desired to manufacture an article A like that shown in Fig. 3 having parts of different diameters and thicknesses. I first prepare a container B such as is shown in Fig. 4. This container has a bore or interior cavity C which is of the size and shape of the completed article, due allowance being made for the shrinkage which takes place after the expanding pressure has been released. In practice, the container B may be made of more than one section, as for instance, the parts $a$ and $b$. One end of the container is closed by a suitable plug 11 (see Fig. 1) which is held in place by a crosshead 12 connected to another crosshead 13 by tie members 14 and 15. The article A to be expanded is then inserted in the container, its own bore being closed by the plug 16 at one end and at the other by the plug 17. Suitable packings 18 to prevent leakage are employed, but as they form no part of my present invention, they will not be described in detail. At intervals lengthwise of the container are drilled small radial holes 19 (see Figs. 1, 4 and 5), through which are inserted feelers 20 which are connected to dial gauges 21 mounted on rings 22 which surround the container. These feelers 20 are in contact with the outer surface of the article to be expanded and therefore the dials which are operated by the feelers register the progress of the expansion of the article.

Thereafter, water under pressure is forced into the hollow bore within the article to be expanded and the pressure increased until the dial gauges show that the article has begun to expand. Thereafter, the pressure is increased until the exterior surface of the article contacts with the bore of the container throughout its length and is thus restrained from further expansion. The gauges then cease to move and thus notify the operator that the expansion is complete.

Thereafter the pressure is released and the article withdrawn from the container. If work is to be done in successive stages, the article may be then annealed, again placed in another and slightly larger container, the interior of which is of the size which it is desired to have the article assume after the second stage of expansion.

By properly determining the size of the bore of the container, the final size and shape of the article can be determined. Also if there is a proper relation between the original size of the article and the final size, the elastic limit will be raised the desired amount. It will also be seen that the increase in elastic limit produced will be controlled by the clearance between the article and the bore of the container and that the desired increase can be obtained by having the correct amount of clearance to start with.

If it is desired to increase the elastic limit of one part of the article more than another, this can be accomplished by allowing proper differences in clearance. In designing the container or mold due consideration is given to two facts, first that the expansion of the article in one direction causes a corresponding contraction in another direction and second that the thinnest part of the article will contact with the wall of the container first gripping it and the subsequent contraction of the article will draw the remainder toward that part. Thus in making a gun the muzzle end being thinnest will expand fastest and grip the container, and the shortening of the gun longitudinally will draw the breech toward the muzzle. In designing the container particularly when the exterior of the article is of uneven contour, suitable provision is made for these effects.

Figure 6:
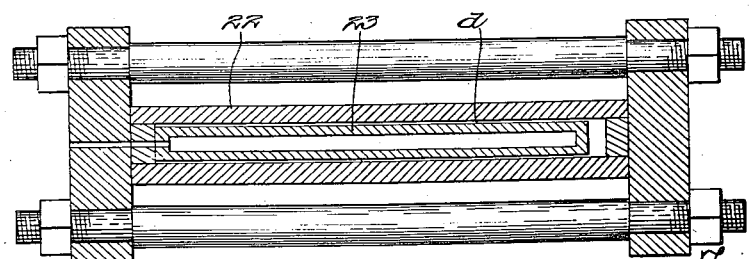
Fig. 6 is a sectional view showing an apparatus for practicing my invention in another way.

In some cases it is desirable to increase the elastic limit by means of longitudinal stretching, or by both longitudinal and circumferential stretching. In Fig. 6 suitable apparatus for doing this is shown. In this figure the container 22 is closed at the ends and the article 23 to be operated upon is likewise closed at the ends. Sufficient clearance between the ends of the article and the inside surface of the ends of the container is left so that the expansion of the article will be stopped when the desired increase in elastic limit is reached. Clearance $d$ is left around the sides of the article if circumferential stretching is desired also.

What I claim is:

1. The method of raising the elastic limit of a hollow metal object which consists in subjecting the material composing it to uniform fluid pressure while the object is in juxtaposition with the mold which stops the movement of the material when a predetermined amount of movement is reached, said pressure being exerted both radially and longitudinally to produce corresponding stretching of the fibres.

2. The method of raising the elastic limit of a hollow metallic article which comprises subjecting it to internal stretching pressure while it is restrained by a temporary mold against movement beyond a predetermined amount.

3. The method of raising the elastic limit of a hollow metallic article which comprises subjecting it to an internal expansion pressure while it is contained within the mold, the interior of which is of the size and shape to be given to the finished article, due allowance being made for final shrinkage.

4. The method of making a hollow metallic article of varying thickness which consists in subjecting it to an internal expanding pressure, and thereby permanently expanding it while it is enclosed in a mold which prevents it expanding beyond a predetermined amount which varies with different portions of the article.

5. The method of making a hollow metal object which consists in enclosing it within a mold with a clearance between the article and the mold, said clearance being different at different points, and then expanding it until it fills the mold whereby some parts are expanded more than others and the elastic limit of the several parts is correspondingly varied.

6. The apparatus for raising the elastic limit of a hollow metallic article which consists in a restraining mold to contain the article to be treated and means for subjecting the article to an internal expanding pressure to bring its exterior to the size and shape of the interior of the mold.

7. The apparatus for raising the elastic limit of a hollow metallic article which comprises a restraining mold to contain the article to be treated and means for subjecting the article while contained within the mold to an internal expanding pressure, the size and shape of the interior of the mold being such as to stop the expansion of the article when a predetermined increase in the elastic limit of any given portion has been reached.

8. The apparatus for raising the elastic limit of hollow metallic articles which consists in a restraining mold to contain the articles to be treated, said mold having one or more transverse apertures at intervals throughout its length, means for subjecting the article to an internal expanding pressure to bring its exterior to the size and shape of the interior of the mold, feelers extending through said apertures in the mold and contacting with the exterior of the article, and means operated by the feelers to determine the amount of movement of the exterior of the article relative to the mold.

In testimony whereof I affix my signature.

FREDERICK C. LANGENBERG.